United States Patent [19]

Meeker

[11] 4,070,103
[45] Jan. 24, 1978

[54] SPECTACLE FRAME WITH ATTACHABLE ONE-PIECE SLIDE-ON RIM

[76] Inventor: Martha C. Meeker, 5768 North Ewing, Indianapolis, Ind. 46220

[21] Appl. No.: 651,842

[22] Filed: Jan. 23, 1976

Related U.S. Application Data

[63] Continuation-in-part of Ser. No. 468,666, May 10, 1974, abandoned.

[51] Int. Cl.$^2$ .................. G02C 11/02; G02C 9/04
[52] U.S. Cl. ........................................ 351/52; 351/47; 351/57; 351/58; 351/154
[58] Field of Search .................. 351/47, 48, 51, 52, 351/57, 58, 153, 154

[56] References Cited

U.S. PATENT DOCUMENTS

| | | | |
|---|---|---|---|
| 3,526,450 | 9/1970 | Berry | 351/52 |
| 3,542,459 | 11/1970 | Lindstrom | 351/47 |
| 3,565,517 | 2/1971 | Gitlin et al. | 351/106 |

FOREIGN PATENT DOCUMENTS

| | | | |
|---|---|---|---|
| 863,726 | 3/1961 | United Kingdom | 351/52 |
| 494,420 | 10/1938 | United Kingdom | 351/153 |

*Primary Examiner*—Paul A. Sacher
*Attorney, Agent, or Firm*—Woodard, Weikart, Emhardt & Naughton

[57] ABSTRACT

A spectacle combination which allows the wearer of eye glasses to change a single pair of glasses to match any individual fashion or mood. The basic spectacle unit is a combination of two lens, two lens rims, two temple members and a nose bridge. To complete the combination there are a number of attachable pairs of one-piece lens rim covers of various colors, designs, shapes and materials. The easily slid on lens rim covers are securely held in position by a lip, friction tape, magnetic strips or a snap-on type of friction fitting arrangement. Tinted lens may be inserted in the individual pairs of lens rim covers in order to transform normal spectacles into sunglasses. In addition, the lens rim covers may be designed to affect a change in the shape of the actual lens itself from, for instance, the standard elliptical shape to a more high fashion octagonal square or rectangular shape.

22 Claims, 14 Drawing Figures

SPECTACLE FRAME WITH ATTACHABLE ONE-PIECE SLIDE-ON RIM

CROSS REFERENCE TO RELATED APPLICATION

This application is a continuation-in-part of my U.S. patent application Ser. No. 468,666 filed May 10, 1974, and now abandoned.

BACKGROUND OF THE INVENTION

1. Field of the Invention

This invention relates to spectacles and eyeglasses with ornamentation or decoration detachably secured.

2. Description of the Prior Art

Although there is much prior art in the field of ornamental or decorative covers for spectacles or eyeglasses, many of these inventions describe spectacles which cannot be worn by themselves without the decorative covers since hinges, prongs, wires or magnetic tape have been secured to them or holes or other fastening means drilled into or through them to facilitate applying of the decorative frontispiece or rim covers. In addition, trims for those spectacles, which can be worn individually without the application of the decorative covers, generally are not one piece and require very inconvenient fastening means such as screwdrivers, physically bending the frame or cover, or other forms of tools or severe manual manipulation to physically attach the ornamental cover to the basic spectacle. Sample patents teaching such spectacle frames are U.S. Pat. No. 3,034,401 to Radziwon (1962) and U.S. Pat. No. 3,025,761 to Beasse (1962).

The prior art spectacles and ornamental covers for these spectacles are characterized by the fact that in general only one ornamental cover is provided for each pair of spectacles. In direct contrast to this, the spectacle frames and covers of this invention provide virtually unlimited choices for size, color, design and material. This type of advantage is especially important for those people who want to purchase only one pair of ophthalmic lens and frames for economic and sight reasons but at the same time want to be fashionably modern on a variety of occasions. With this invention, it is possible to convert the basic pair of spectacles into numerous fashionable frames in addition to being able to convert the basic spectacles into fashionable sunglasses. Therefore, in addition to providing an endless variety of lens rim covers for one pair of basic spectacles, this invention allows them further to be converted into sunglasses and even what are commonly referred to today as prescription sunglasses.

Other prior art spectacles are designed to accept decorative frontispieces having means for mounting by hooking over the nosepiece and temple hinge. The latter frontispieces do not include continuous rim covers or attachment means for attaching continuous one-piece covers. Some are known to use an embedded magnet or magnets in the frontal portion of the lens rims for attaching the decorative frontispiece which also has a magnet or magnets of an opposite pole. The magnets are heavy and unsightly when the frontispiece is not in place. Those frontispieces incorporating magnets also do not have continuous rim walls nor are the spectacles designed to accept continuous covers. Patents of interest cited during the prosecution of the parent patent application include the U.S. Pat. No. 2,832,260 to De Angelis et al and the Great Britain Pat. Nos. 863,726 and 855,268.

SUMMARY OF THE INVENTION

This invention relates to a spectacle frame combination including a pair of lens rims, a pair of lens supported by the lens rims, a nose bridge connecting the lens rims, a pair of temple members being attached to the lens rims, a minimum of one pair of lens rim covers, the pair of lens rim covers including two separate lens rim covers being individually attachable to one lens rim of the pair of lens rims, each of the lens rim covers being continuous around the perimeter of an opening, the opening permitting unobstructed visibility, the covers including continuous side walls extending circumferentially around the outermost surface of the rims.

It is an object of this invention to provide a spectacle frame combination having interchangeable lens rim covers.

It is a further object of this invention to provide interchangeable covers for lens rims wherein said covers may be attached without the necessity of severe physical manipulation or tools such as screwdrivers.

It is a still further object of this invention to provide a spectacle frame combination in which not only the color, design or material from which the covers are made may be changed but also which affects the changing of the shape of the actual lens itself.

An additional object of this invention is to provide a spectacle frame combination which allows the use of lens rim covers which encase tinted glass to cover normal spectacles thus converting the normal spectacles into prescription sunglasses.

These and other objects of this invention will become apparent from the following description of the preferred embodiment.

DESCRIPTION OF THE PREFERRED EMBODIMENT

Figure 1:
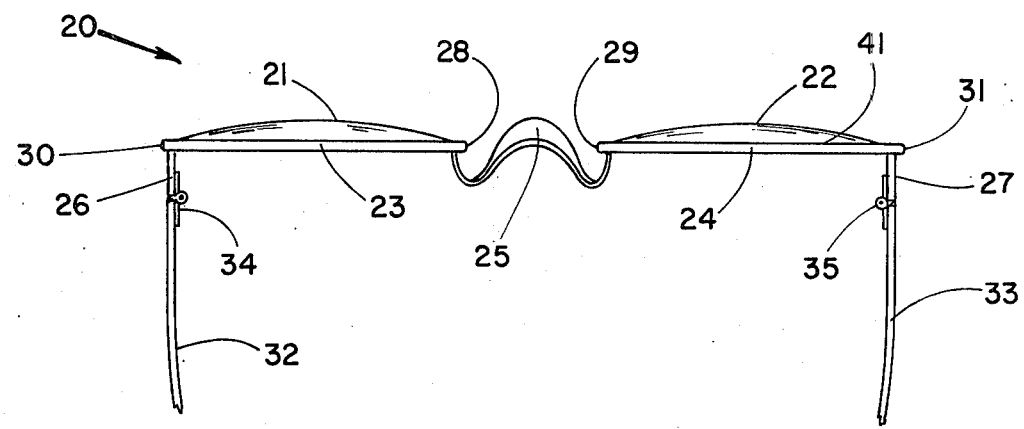
FIG. 1 is a top view of the first embodiment of the assembled spectacle frame without lens rim covers.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device and such further applications of the principles of the invention as illustrated therein being contemplated as would normally occur to one skilled in the art to which the invention relates.

For purposes of the descriptions in this application, the following terms will be used. The term "front" shall be understood to refer to that portion of the spectacle rim or rim cover farthest forward from the eye of the wearer while the term "rear" shall refer to that portion closest to the eye of the wearer. The term "outer" shall refer to that portion of the lens rim or lens rim cover farthest from the center of the lens while the term "inner" shall refer to that portion closest to the lens center. In addition, the terms "glasses," "eyeglasses" and "spectacles" will be used interchangeably.

Referring now particularly to FIG. 1, it can be seen that spectacle frame 20 comprises two lenses 21 and 22 which would be of a clear or slightly tinted glass or plastic material and could be ground according to the user's individual needs. Lenses 21 and 22 may or may not be identical depending on the particular visual deficiency of the wearer and whether or not said visual deficiency applies to both eyes or one eye or is present in distinct degrees in one eye or the other, although both lenses are generally the same shape. Lenses 21 and 22 are encased by lens rims 23 and 24 respectively. Lens rims 23 and 24 may be made of any well-known materials including but not limited to metals and hard plastics. Lens rims 23 and 24 may also be of a thickness, color or consistency to suit the individual wearer, but preferably light in weight. Preferably, also, lens rims 23 and 24 would be partially or entirely made from a magnetizable material to facilitate convenient attachment of the lens rim covers. Lens rims 23 and 24 are joined at points 28 and 29 by nose bridge 25. As shown in FIG. 1, nose bridge 25 is recessed. It should be noted that points of attachment 28 and 29 would not be visible from the front side of the glasses. This is considered especially desirable from a design and appearance standpoint as well as for ease of sliding lens rim covers on the rims.

Figure 8:
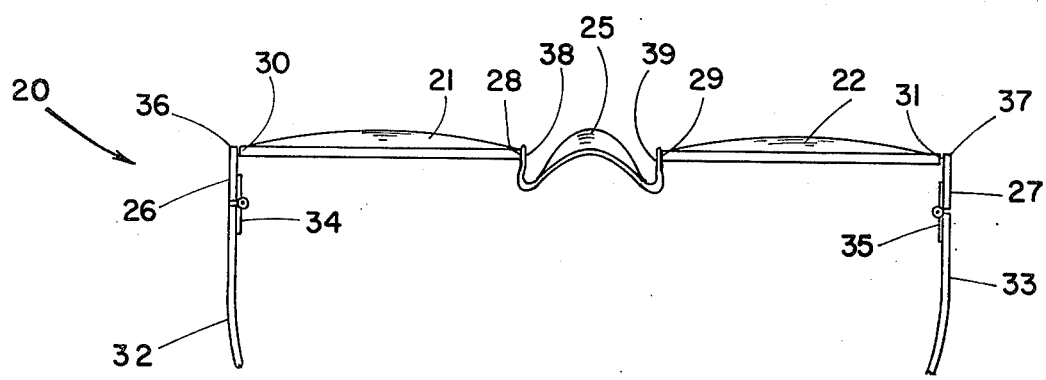
FIG. 8 is a top view of the second embodiment of the basic spectacle frame.
Figure 9:
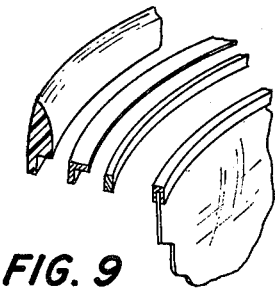
FIG. 9 is a partial perspective view of the relationship of an assortment of lens rim covers to a lens rim.

Although temple members 32 and 33 may be attached directly to lens rims 23 and 24, the preferred method of attachment is by means of temple extension members 26 and 27. Although it is preferred that the temple members be hingedly attached to lens rims 23 and 24, a rigid means of attachment can be used if desired. Temple extension members 26 and 27 are attached to lens rims 23 and 24 at points 30 and 31 respectively. It should be noted here also that points of attachment 30 and 31 would not be visible from the front side of the glasses. Temple extension members 26 and 27 are hingedly attached to temple members 32 and 33 by means of hinges 34 and 35 respectively. These elements comprise the basic spectacle frame 20. An alternative embodiment of the basic spectacle frame is shown at FIG. 8 wherein nose bridge 25 is tangently attached at points 28 and 29 and temple extension members 26 and 27 are tangently attached at points 30 and 31 respectively in a manner which is visible from the front of spectacle frame 20.

Figure 2:
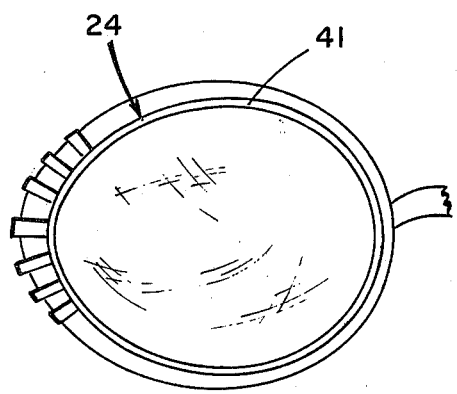
FIG. 2 is a front view of a first embodiment of a lens rim cover.
Figure 3:
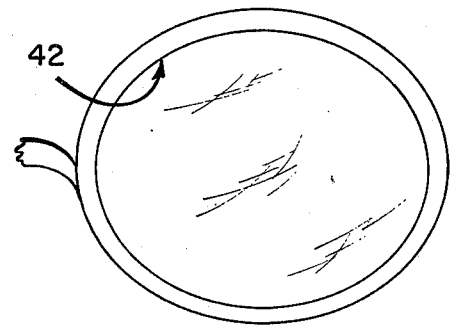
FIG. 3 is a front view of a second embodiment of a lens rim cover.
Figure 4:
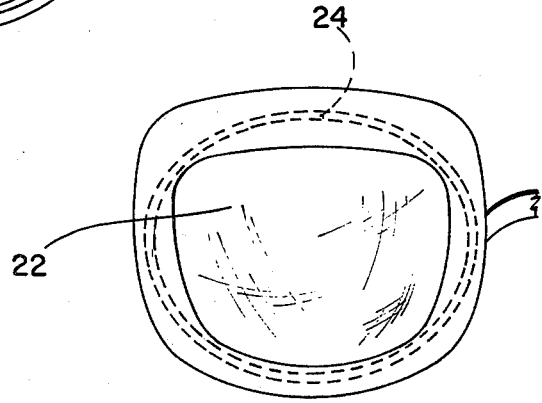
FIG. 4 is a front view of a third embodiment of a lens rim cover.

Lens rim covers for the basic spectacles 20 may come in a variety of sizes, shapes, designs and may be constructed of a variety of materials. Three embodiments of lens rim covers are illustrated by FIGS. 2, 3 and 4. Although for purposes of this application the lens rim covers are referred to in the plural, in actual use they would in most cases be identical but reversed to comprise a pair. Although these figures represent the basic types of construction of the lens rim covers, each of the types represented by FIGS. 2, 3 and 4 may have unlimited variations comprising the various sizes, shapes, forms and materials.

Figure 5:
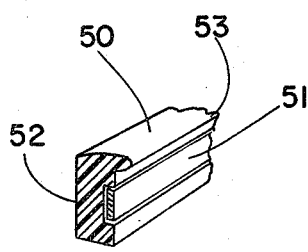
FIG. 5 is a partial side perspective view of an attachment means for the first embodiment of a lens rim cover.

More specifically, FIG. 2 represents a lens rim cover which continuously surrounds only the outermost edge of lens rims 23 and 24. Thus, both the front side 41 of lens rim 24 and the lens rim cover of FIG. 2 are exposed and in fact are designed to blend together to form an aesthetically pleasing combination. A potential method for attachment of the lens rim cover of FIG. 2 to a lens rim is illustrated by FIG. 5 wherein the number 50 represents the rear of the lens rim cover and the number 52 represents the outermost surface of the continuous side wall of lens rim cover shown in FIG. 2. The method of attachment illustrated in FIG. 5 is a magnetic band 51 which is inserted in a groove on the inside surface of said lens rim cover of FIG. 2. The magnetic band adheres to the outer surface of lens rim 24 if the rim is partially or entirely of magnetizable material. A flexible lip 53 is further provided to prevent the lens rim cover from sliding forward and falling off of the spectacle frames 20 during actual use. Either or both means of attachment may be used.

Figure 6:
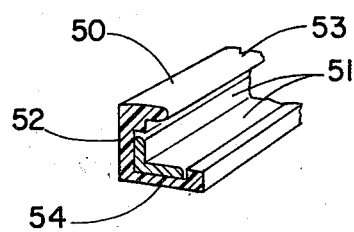
FIG. 6 is a partial side perspective view of an attachment means for the second embodiment of a lens rim cover.

The second type of lens rim cover is illustrated by FIG. 3. This type of lens rim cover is distinct from that illustrated by FIG. 2 in that the lens rim cover covers the outermost and front surfaces of lens rim 23. A cross-sectional view of the type of lens rim cover illustrated in FIG. 3 is provided in FIG. 6. In FIG. 6 it can be seen that front surface 54 is a surface that is seen by a person looking at the wearer. In addition, outer surface 52 and rear surface 50 surround lens rim 23. The outer surface 52 of the continuous side wall of the cover extends circumferentially around the rim. The preferred method of attachment is again a magnetic strip 51 providing the lens rim is partially or entirely of magnetizable material. The magnetic strip is shown in FIG. 6. Again, flexible lip 53 may be provided to prevent the lens rim cover from sliding forward while being used.

Figure 7:
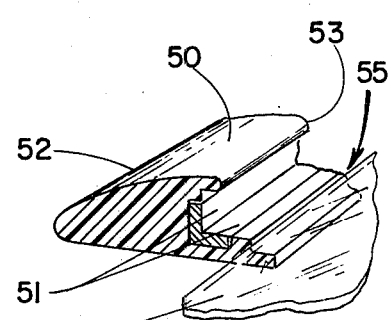
FIG. 7 is a partial side perspective view of an attachment means of the third embodiment of a lens rim cover also showing a tinted sun lens attached therein.

A third type of lens rim cover is illustrated in FIG. 4. In FIG. 4 it can be seen by the interrupted line the positioning of the actual lens rim 24 in respect to the lens rim cover. It is important to note that the type of lens rim cover illustrated by FIG. 4 is such that the actual shape of the viewing lens 22 can be changed as in fact it has been changed from an oval shape to a semi-rectangular shape in FIG. 4. The preferred method of attachment used for lens rim covers of the type illustrated by FIG. 4 is shown in FIG. 7. Again, front surface 54, outer surface 52, rear surface 50 and flexible lip 53 are shown along with a groove to contain the preferred attachment means of a magnetic band 51. The outer surface 52 of the continuous side wall extends circumferentially around the rim. However, an additional groove 55 is provided where tinted glass 56 may be encased or mounted so as to transform an ordinary pair of lens rim covers into a pair of attachable sunglasses. The mounting of tinted glass is possible in the other types of lens rim covers as illustrated in FIGS. 2 and 3 although it is most conveniently accomplished with a heavier and thicker lens rim cover as shown by FIG. 4.

The grooves formed in the inwardly facing continuous side walls of the lens rim covers are sized to receive friction tape or magnetic tape. Alternatively, the tape may be left out of the grooves to allow for the lens rims to be snap-fitted into the grooves.

The lens rim covers as illustrated in FIGS. 2, 3 and 4 are separate entities. Therefore, as illustrated, they are designed to cover the lens rims only and to leave the nose bridge exposed. However, this is merely for the sake of convenience and if it is desired that nose bridge 25 be covered, it may be covered.

Figure 10:
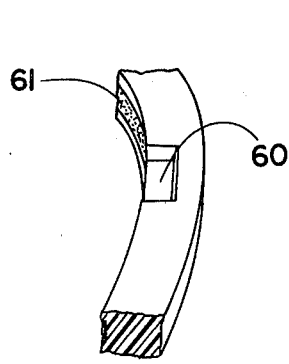
FIG. 10 is a partial perspective view of a lens rim cover showing the positioning of the notch for accepting the nose bridge or temple extension member of the second embodiment of the basic spectacles.
Figure 11:
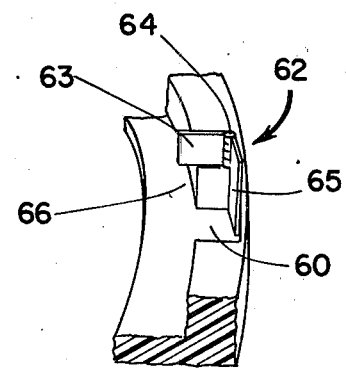
FIG. 11 is a partial perspective view showing a lens rim cover with an L-shaped spring biased hinge as the attachment means.
Figure 12:
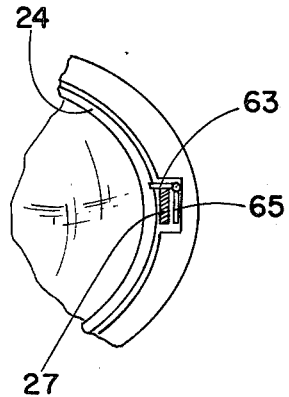
FIG. 12 is a rear elevational view showing the spring biased hinge of FIG. 11 closed over a temple extension member.
Figure 13:
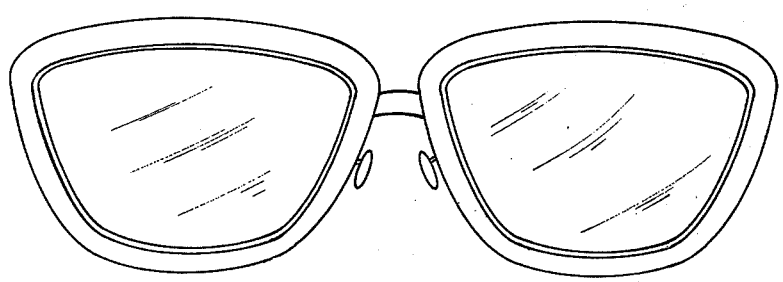
FIG. 13 is a front view of a pair of spectacles with lens rim covers in place showing the unaffected size of the actual viewing lens.
Figure 14:
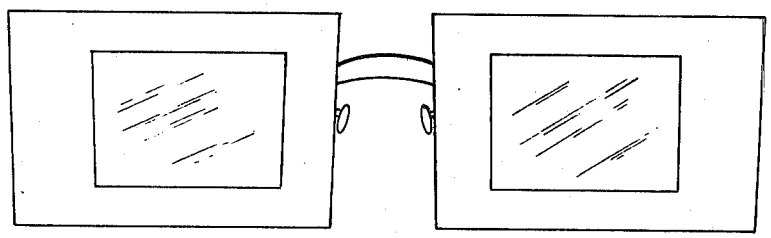
FIG. 14 is a front view of a pair of spectacles with lens rim covers in place wherein the actual shape and size of the viewing lens has been altered by the lens rim cover.

Methods for attaching lens rim covers to the lens rims of the spectacles of FIG. 8 are illustrated by FIGS. 10, 11 and 12. FIG. 10 shows a groove 60 for accepting the nose bridge or temple extension member. Magnetic band 61 attaches to the outer circumferential surface of the rim. If the magnetic band is not used, then the next preferred method of attachment is by a snap-on friction fit with flexible lip 53 (FIG. 5,6,7). Another method of attachment is by spring biased hinges 62 as shown in FIGS. 11 and 12. L-shaped spring biased hinge 62 may be used to fasten lens rim covers to lens rims 23 and 24. The hinges comprise basically an upper pivotal portion 63, a hinge 64 and an additional hinge portion 65. When the lens rim cover is being placed onto the lens rims of the spectacle frame 20 of FIG. 8 or is being taken off, upper pivotal portion 63 of spring biased hinge 62 is in the open position. Upon being placed on the lens rim it is snapped down in the closed position atop and in contact with the temple extension (and nose bridge) as shown in FIG. 12. It should be noted that the upper pivotal portion 63 catches over temple extension member 27 and nose bridge 39 and at the same time catches behind lens rim 24 thus preventing any forward or sideways motion of the lens rim cover. The nose bridge and temple members may be attached to the rear surface of the lens rims or to the outermost surface of the lens rims.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:
1. A spectacle frame combination including:
 a. a pair of lens rims;
 b. a pair of lenses supported by said lens rims;
 c. a nose bridge connecting said lens rims;
 d. a pair of temple members being attached to said lens rims;
 e. a minimum of one pair of lens rim covers, said pair of lens rim covers including two separate lens rim covers, each of said two lens rim covers being individually attachable to one lens rim of said pair of lens rims, each of said lens rim covers being continuous around the perimeter of an opening, said opening permitting unobstructed visibility, said covers including continuous side walls extending circumferentially around the outermost surface of said rims;
 f. wherein said nose bridge and said temple members are attached to the rear surfaces of said lens rims; and
 g. wherein the innermost surface of said side walls of said covers includes a tape receiving groove.

2. The combination of claim 1 and further including tape received within the tape receiving groove, said tape being of frictionable material.

3. The combination of claim 1 and further including tape received within the tape receiving groove, said tape being magnetic.

4. The combination of claim 3 wherein said lens rims of said frame are of magnetizable material.

5. The combination of claim 2 wherein said covers include front walls joined to said side walls with said front walls projecting inwardly and extending circumferentially around the frontal surface of said lens rims.

6. The combination of claim 4 wherein said covers include front walls joined to said side walls with said front walls projecting inwardly and extending circumferentially around the frontal surfaces of said lens rims.

7. The combination of claim 5 wherein said front walls of said covers include rear surfaces which are grooved in such a manner that a supplementary tinted lens may be encased thereby.

8. The combination of claim 6 wherein said front walls of said covers include rear surfaces which are grooved in such a manner that a supplementary tinted lens may be encased thereby.

9. A spectacle frame combination including:
 a. a pair of lens rims;
 b. a pair of lenses supported by said lens rims;
 c. a nose bridge connecting said lens rims;
 d. a pair of temple members being attached to said lens rims;
 e. a minimum of one pair of lens rim covers, said pair of lens rim covers including two separate lens rim covers, each of said two lens rim covers being individually attachable to one lens rim of said pair of lens rims, each of said lens rim covers being continuous around the perimeter of an opening, said opening permitting unobstructed visibility, said covers including continuous side walls extending circumferentially around the outermost surface of said rims;
 f. wherein said nose bridge and said temple members are attached to the rear surfaces of said lens rims;
 g. wherein said covers include front walls joined to said side walls with said front walls projecting inwardly and extending circumferentially around the frontal surface of said lens rims; and
 h. wherein said front walls of said covers include rear surfaces which are grooved in such a manner that a supplementary tinted lens may be encased thereby.

10. The combination of claim 9 wherein the innermost surface of said side walls of said covers includes an inwardly projecting lip at the rear edge.

11. A spectacle frame combination including:

a. a pair of lens rims;
b. a pair of lenses supported by said lens rims;
c. a nose bridge connecting said lens rims;
d. a pair of temple members being attached to said lens rims;
e. a minimum of one pair of lens rim covers, said pair of lens rim covers including two separate lens rim covers, each of said two lens rim covers being individually attachable to one lens rim of said pair of lens rims, each of said lens rim covers being continuous around the perimeter of an opening, said opening permitting unobstructed visibility, said covers including continuous side walls extending circumferentially around the outermost surface of said rims;
f. wherein said nose bridge and said temple members are attached to the outermost surfaces of said lens rims; and
g. wherein the innermost surface of said side walls of said covers includes a tape receiving groove.

12. The combination of claim 11 wherein said covers include front walls joined to said side walls with said front walls projecting inwardly and extending circumferentially around the frontal surfaces of said lens rims.

13. The combination of claim 11 and further including tape received within the tape receiving groove, said tape being magnetic.

14. The combination of claim 12 and further including tape received within the tape receiving groove, said tape being magnetic.

15. The combination of claim 13 wherein said lens rims of said frame are of magnetizable material.

16. The combination of claim 14 wherein said lens rims of said frame are of magnetizable material.

17. The combination of claim 16 wherein said front walls of said covers include rear surfaces which are grooved in such a manner that a supplementary tinted lens may be encased thereby.

18. A spectacle frame combination including:
a. a pair of lens rims;
b. a pair of lenses supported by said lens rims;
c. a nose bridge connecting said lens rims;
d. a pair of temple members being attached to said lens rims;
e. a minimum of one pair of lens rims covers, said pair of lens rim covers including two separate lens rim covers, each of said two lens rim covers being individually attachable to one lens rim of said pair of lens rims, each of said lens rim covers being continuous around the perimeter of an opening, said opening permitting unobstructed visibility, said covers including continuous side walls extending circumferentially around the outermost surface of said rims;
f. wherein said nose bridge and said temple members are attached to the outermost surfaces of said lens rims;
g. wherein said covers include front walls joined to said side walls with said front walls projecting inwardly and extending circumferentially around the frontal surfaces of said lens rims; and
h. wherein said front walls of said covers include rear surfaces which are grooved in such a manner that a supplementary tinted lens may be encased thereby.

19. The combination of claim 18 wherein the innermost surface of said side walls of said covers includes an inwardly projecting lip at the rear edge.

20. A spectacle frame combination including:
a. a pair of lens rims;
b. a pair of lenses supported by said lens rims;
c. a nose bridge connecting said lens rims;
d. a pair of temple members being attached to said lens rims;
e. a minimum of one pair of lens rim covers, said pair of lens rim covers including two separate lens rim covers, each of said two lens rim covers being individually attachable to one lens rim of said pair of lens rims, each of said lens rim covers being continuous around the perimeter of an opening, said opening permitting unobstructed visibility, said covers including continuous side walls extending circumferentially around the outermost surface of said rims;
f. wherein said nose bridge and said temple members are attached to the rear surfaces of said lens rims;
g. wherein said covers include front walls joined to said side walls with said front walls projecting inwardly and extending circumferentially around the frontal surfaces of said lens rims; and
h. wherein said covers include L-shaped spring biased hinges, said hinges include a lower member being attached to the innermost surface of said covers adjacent the nose bridge and adjacent the temple members, the lower members being positioned at the outermost surfaces of the portions of the nose bridge and the temple members adjacent the lens rims, said hinges including upper members hingedly attached to the tops of the lower members, the upper members being spring biased against the tops of the portions of the nose bridge and the temple members adjacent the lens rims, said hinges when open permitting said lens rim covers to be slidably received by said lens rims, said hinges when closed over said nose bridge and said temple members and behind said lens rims restrict movement of said lens rim covers with respect to said lens rims, said nose bridge, and said temple members when said covers are positioned on said spectacle frame.

21. A spectacle frame combination including:
a. a pair of lens rims;
b. a pair of lenses supported by said lens rims;
c. a nose bridge connecting said lens rims;
d. a pair of temple members being attached to said lens rims;
e. a minimum of one pair of lens rim covers, said pair of lens rim covers including two separate lens rim covers, each of said two lens rim covers being individually attachable to one lens rim of said pair of lens rims, each of said lens rim covers being continuous around the perimeter of an opening, said opening permitting unobstructed visibility, said covers including continuous side walls extending circumferentially around the outermost surface of said rims;
f. wherein said nose bridge and said temple members are attached to the outermost surfaces of said lens rims;
g. wherein said covers include front walls joined to said side walls with said front walls projecting inwardly and extending circumferentially around the frontal surfaces of said lens rims; and
h. wherein said covers include L-shaped spring biased hinges, said hinges include a lower member being attached to the innermost surface of said covers adjacent the nose bridge and adjacent the temple members, the lower members being positioned at the outermost surfaces of the portions of the nose bridge and the temple members adjacent the lens rims, said hinges including upper members hingedly attached to the tops of the lower members, the upper members being spring biased against the tops of the portions of the nose bridge and the temple members adjacent the lens rims, said hinges when open permitting said lens rim covers to be slidably received by said lens rims, said hinges when closed over said nose bridge and said temple members and behind said lens rims restrict movement of said lens rim covers with respect to said lens rims, said nose bridge, and said temple members when said covers are positioned on said spectacle frame.

22. In a spectacle frame combination including:

a pair of lens rims;

a pair of lens supported by said lens rims;

a nose bridge, said nose bridge connecting said lens rims;

a pair of temple members, said temple members being attached to said lens rims, and a pair of lens rim covers, said pair of lens rim covers including two separate lens rim covers, each of said two lens rim covers being individually attachable to one lens rim of said pair of lens rims, each of said lens rim covers being continuous around the perimeter of an opening, said opening permitting unobstructed visibility wherein the improvement comprises:

each of said covers including a continuous side wall extending circumferentially around said rims, said covers further include front walls joined to said side walls and projecting inwardly of said rims adjacent the front surfaces of said lens limiting movement between said covers and said rims;

said side walls extend rearwardly of said lens and said rims being provided with nose bridge and temple member accepting grooves into which said temple and nose bridge members project;

said combination further includes L-shaped, spring biased hinges including upper members, said hinges being positioned in said nose bridge and temple member accepting grooves and projecting inwardly toward said lens, said hinges including spring means operable to bias said upper members downwardly adjacent top portions of said temple and nose bridge members limiting relative movement between said covers and said temple and nose bridge members, said upper members project inwardly of said temple and nose bridge members and inwardly adjacent said rims limiting relative motion between said covers and said rims.

* * * * *